(12) United States Patent
Ewert

(10) Patent No.: US 11,835,634 B2
(45) Date of Patent: Dec. 5, 2023

(54) POSITION DETERMINING ARRANGEMENT FOR A VEHICLE, AND VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 17/427,330

(22) PCT Filed: Feb. 12, 2020

(86) PCT No.: PCT/EP2020/053604
§ 371 (c)(1),
(2) Date: Jul. 30, 2021

(87) PCT Pub. No.: WO2020/182398
PCT Pub. Date: Sep. 17, 2020

(65) Prior Publication Data
US 2022/0137238 A1 May 5, 2022

(30) Foreign Application Priority Data
Mar. 12, 2019 (DE) ...................... 10 2019 203 332.6

(51) Int. Cl.
*G01S 19/47* (2010.01)
*B60W 10/12* (2012.01)
(Continued)

(52) U.S. Cl.
CPC .............. *G01S 19/17* (2013.01); *B60W 40/10* (2013.01); *B60W 40/12* (2013.01); *G01S 19/46* (2013.01)

(58) Field of Classification Search
CPC .......... G01S 19/47; G01S 19/46; G01S 19/14; G01S 19/41; G01S 19/49; G01S 19/35; B60W 40/10; B60W 40/12
See application file for complete search history.

(56) References Cited

U.S. PATENT DOCUMENTS

| 5,461,388 A | 10/1995 | Applegate et al. |
| 5,644,317 A | 7/1997 | Weston et al. |
| (Continued) | | |

FOREIGN PATENT DOCUMENTS

| JP | 2002-161321 A | 6/2002 |
| JP | 2005-156246 A | 6/2005 |
| (Continued) | | |

OTHER PUBLICATIONS

International Search Report corresponding to PCT Application No. PCT/EP2020/053604, dated Apr. 20, 2020 (German and English language document) (7 pages).

*Primary Examiner* — Brian P Sweeney
(74) *Attorney, Agent, or Firm* — Maginot, Moore & Beck LLP

(57) ABSTRACT

A position determining arrangement for a vehicle includes: a receiving device, in particular an antenna, designed to receive a navigation satellite signal from a navigation satellite; a processing device designed to provide a first signal depending on the received navigation satellite signal, the first signal describing a navigation satellite signal-based position of the receiving device in a coordinate system; at least one inertial sensor designed to detect an acceleration and/or a rate of rotation; a computing unit designed to determine an adapted position of the receiving device in the coordinate system depending on the first signal and the detected acceleration and/or rate of rotation; and a first housing in which at least the computing unit is located. The position determining arrangement includes a second housing independent of and spatially separated from the first housing, and the inertial sensor is located in the second housing.

20 Claims, 2 Drawing Sheets

(51) Int. Cl.
*B60W 40/10* (2012.01)
*G01S 19/46* (2010.01)
*G01S 19/17* (2010.01)
*B60W 40/12* (2012.01)

(56) References Cited

U.S. PATENT DOCUMENTS

| | | |
|---|---|---|
| 6,792,352 B1 | 9/2004 | Hoffmann et al. |
| 2016/0231429 A1* | 8/2016 | Wilson .................... G01S 19/35 |
| 2018/0364366 A1 | 12/2018 | Cvijetic et al. |

FOREIGN PATENT DOCUMENTS

| | | |
|---|---|---|
| JP | 2008-145247 A | 6/2008 |
| JP | 2012-193965 A | 10/2012 |
| JP | 2014-201197 A | 10/2014 |
| WO | 02/46699 A1 | 6/2002 |
| WO | 2017/164118 A1 | 9/2017 |

* cited by examiner

POSITION DETERMINING ARRANGEMENT FOR A VEHICLE, AND VEHICLE

This application is a 35 U.S.C. § 371 National Stage Application of PCT/EP2020/053604, filed on Feb. 12, 2020, which claims the benefit of priority to Serial No. DE 10 2019 203 332.6, filed on Mar. 12, 2019 in Germany, the disclosures of which are incorporated herein by reference in their entirety.

The disclosure relates to a position determining arrangement for a vehicle, having a receiving device, in particular an antenna, which is designed to receive at least one navigation satellite signal from at least one navigation satellite, a processing device which is designed to provide a first signal depending on the received navigation satellite signal, said first signal describing a navigation satellite signal-based position of the receiving device in a coordinate system, at least one inertial sensor which is designed to detect an acceleration and/or a rotation rate, a computing unit designed to determine an adjusted position of the receiving device in the coordinate system depending on the first signal on the one hand and the detected acceleration and/or the detected rotation rate on the other hand, and having a first housing in which at least the computing unit is arranged.

BACKGROUND

Global Navigation Satellite Systems (GNSS) allow a position of receiving devices, such as antennas, to be determined in a coordinate system. For this purpose, the navigation satellite systems comprise a plurality of navigation satellites that are designed to broadcast navigation satellite signals. The receiving devices are designed to receive the navigation satellite signals.

So-called VMP sensors (Vehicle Motion and Position Sensor) are known from the prior art. A VMP sensor is a sensor or sensor module for a vehicle. The VMP sensor comprises a processing device. This is/can be connected to a receiving device of the vehicle at least for communication purposes and is designed to provide or generate a first signal depending on navigation satellite signals received by the receiving device, said signal describing a navigation satellite signal-based position of the receiving device in the coordinate system.

In addition, the known VMP sensor comprises at least one inertial sensor which is designed to detect an acceleration and/or a rotation rate. Furthermore, the VMP sensor comprises a computing unit which is designed to determine an adjusted position of the receiving device in the coordinate system depending on the first signal on the one hand, and the detected acceleration and/or the detected rotation rate on the other.

Furthermore, the known VMP sensor comprises a housing or first housing, wherein in the case of the known VMP sensor, the computing unit, the inertial sensor and the processing device are arranged in the first housing. Thus, the known VMP sensor and the vehicle receiving device which is connected to the processing device of the VMP sensor, at least for communication purposes, form a position determining arrangement of the type mentioned above.

SUMMARY

The position determining arrangement according to the disclosure having the features described herein has the advantage that the installation space required by the first housing is reduced in comparison to the first housings of previously known position determining arrangements, so that the first housing of the position determining arrangement according to the disclosure can be arranged in a vehicle, for example, in a space-saving manner. For this purpose, according to the disclosure, the position determining arrangement has a second housing independent of the first housing, wherein the first housing and the second housing are arranged spatially separated from each other and the inertial sensor is arranged in the second housing. Because the second enclosure is independent of the first housing, there is no direct mechanical connection between the first housing and the second housing. A separate arrangement means that the first housing is arranged completely outside of the second housing and the second enclosure is arranged completely outside of the first housing. In addition, the separate arrangement means that there is no main housing present in which both the first and the second housing are arranged. The position determining arrangement therefore lacks a main housing. A main housing means a component, the main function of which is to accommodate and hold the first housing and the second housing, for example in an interior of a motor vehicle. For the provision of the first signal, the processing device is designed, for example, to pre-process signals received by the receiving device. In particular, the processing device is designed to determine whether a received signal is a navigation satellite signal or not, and to provide only navigation satellite signals or make them available to the computing unit as the first signal. In particular, the processing device itself is designed to determine the navigation satellite signal-based position of the receiving device depending on the received navigation satellite signals and to provide the navigation satellite signal-based position as the first signal. The design of, for example, the computing unit, the processing device, or the receiving device also refers in the present case to the respective connection of the respective device to other devices/elements of the position determining arrangement, which connection is necessary to carry out the above-mentioned task or function. For example, the processing device is connected to the receiving device for signal communication purposes in order to detect the received navigation satellite signal. This applies analogously to the other devices mentioned.

According to a preferred embodiment the position determining arrangement is part of a vehicle, in particular a motor vehicle, wherein the first housing and the second housing are arranged in the vehicle so as to be spatially separated from each other. Thus, the adjusted position of the receiving device arranged on the vehicle or an adjusted position of the vehicle can be determined precisely by the position determining arrangement.

Preferably, the inertial sensor is arranged in a ceramic housing, arranged in particular in the second housing or formed by the second housing itself. This means that the inertial sensor arranged in the ceramic housing is at least substantially protected against temperature fluctuations. In particular, in addition to the second housing, a ceramic housing assigned to the inertial sensor is provided, in which the inertial sensor is arranged, wherein the ceramic housing is then arranged inside the second housing. As an alternative, the second housing itself is designed as a ceramic housing. The ceramic housing containing the inertial sensor is therefore the second housing.

According to a preferred embodiment it is provided that either the receiving device is designed to receive at least one correction service satellite signal from at least one correction service satellite, or that the position determining arrangement comprises a receiver, in particular an antenna, that is designed to receive the correction service satellite signal. In both of these cases, the position determining arrangement then comprises an evaluation device which is designed to provide a second signal describing a correction value, depending on the correction service satellite signal received. The computing unit is then preferably designed to take the second signal into account when determining the adjusted position. This increases the accuracy of the determined adjusted position. The result achieved is that the deviation of the determined adjusted position from an actual position of the receiving device is small. In the case that the receiving device is designed to receive the correction service satellite signal, the advantage is obtained that the number of components of the position determining arrangement is small. In the case that the position determining arrangement comprises the receiver, the advantage is obtained that a receiving device or receiver can be chosen which differ from each other and which are advantageously suitable for receiving the navigation satellite signal or the correction service satellite signal.

According to a preferred embodiment, the processing device and/or the evaluation device is/are arranged in the first housing. As a result, the processing device and/or the evaluation device are protected by the first housing. In addition, the processing device arranged in the first housing and/or the evaluation device arranged in the first housing can be connected to the computing unit for communication purposes by simple communication techniques.

Preferably, the processing device and/or the evaluation device are arranged outside the first housing. This results in the advantage that the space occupied by the first housing is further reduced. The first housing can therefore be arranged in a particularly compact manner in the vehicle, for example.

According to a preferred embodiment it is provided that the processing device is integrated into the receiving device and/or that the evaluation device is integrated into the receiver. This results in the advantage that the processing device can be easily connected to the receiving device for communication purposes, or that the evaluation device can be easily connected to the receiver for communication purposes.

Preferably, the computing unit is connected to the inertial sensor for communication purposes by means of a field bus, in particular CAN bus or FlexRay bus, an Ethernet, and/or a radio connection. This ensures that the inertial sensor is securely connected to the computing unit for communication purposes.

Preferably, the inertial sensor is connected to a control unit, in particular an airbag control unit and/or a vehicle dynamics management control unit. The control unit is designed to control an airbag of the vehicle or driving assistance system of the vehicle depending on the detected acceleration and/or the detected rotation rate. The detected acceleration and/or the detected rotation rate are thus used both by the computing unit and by the control unit to determine the adjusted position. Compared to the case in which both the control unit and the computing unit are each assigned a separate inertial sensor, this reduces the number of inertial sensors or components. In particular, the inertial sensor is integrated into the control unit. In this case, both the inertial sensor and the control unit are arranged in the second housing. Alternatively, the inertial sensor and the control unit are designed separately from each other. In this case, the control unit is preferably arranged outside of the second housing.

According to a preferred embodiment, it is provided that the computing unit is integrated into a control unit, in particular an airbag control unit, a vehicle dynamics management control unit, and/or a vehicle central control unit. In this case, the first housing is a housing of the control unit. The fact that the computing unit is integrated into an already existing control unit further reduces the installation space required by the position determining arrangement. It should be noted that the control unit in which the computing unit is integrated need not be the same control unit to which the inertial sensor is connected. For example, the computing unit can be integrated into the vehicle central control unit and the inertial sensor can be connected to the airbag control unit and/or the vehicle dynamics management control unit.

Preferably, the position determining arrangement comprises at least one additional inertial sensor. This increases the amount of acceleration data or rotation rate data available to the computing unit for determining the adjusted position. This increases the accuracy when determining the adjusted position. In particular, both of the inertial sensors are arranged in the second housing. Preferably, one of the inertial sensors is designed to detect the acceleration, and another of the inertial sensors to detect the rotation rate.

Preferably, at least one of the inertial sensors is arranged in the region of a transmission tunnel of the vehicle. This region is advantageously suitable for detecting the acceleration and/or the rotation rate of the vehicle.

According to a preferred embodiment it is provided that at least one inertial sensor is arranged on a chassis or bodywork of the vehicle. Preferably, the inertial sensor arranged on the chassis or bodywork is an acceleration sensor. For example, for arrangement on the chassis the inertial sensor is arranged on a vehicle side member. For example, for arrangement on the bodywork the inertial sensor is located on an A, B, C or D pillar of the vehicle. In particular, one inertial sensor is arranged on the chassis and another inertial sensor is arranged on the bodywork. Preferably, the inertial sensor arranged on the bodywork or on the chassis is connected to the airbag control unit and/or the vehicle dynamics management control unit.

Preferably, the computing unit is connected to a rotation rate sensor for communication purposes. A rotation rate sensor refers to a sensor designed to detect an angular velocity of a wheel to which the rotation rate sensor is assigned. Preferably, the computing unit is connected to a steering angle sensor. A steering angle sensor refers to a sensor which is assigned in particular to a steering handle and designed to detect a specified target steering angle as the steering angle. The computing unit is particularly preferably designed to determine the adjusted position, a vehicle speed and a vehicle trajectory depending on the first signal, the detected acceleration, the detected rotation rate, the second signal, the angular velocity and/or the steering angle. In addition, the computing unit is provided with a highly accurate time, such as Universal Time. This is usually contained in the navigation satellite signal and/or in the correction service satellite signal.

The vehicle, in particular motor vehicle, according to the disclosure is characterized by the position determining arrangement according to the disclosure having the features described herein of claim H. This results in the advantages already mentioned. Further preferred features and feature combinations result in particular from the previous description.

BRIEF DESCRIPTION OF THE DRAWINGS

In the following, the disclosure is explained in more detail on the basis of the drawings, with identical and corresponding elements having the same reference signs. In the drawings.

DETAILED DESCRIPTION

Figure 1:
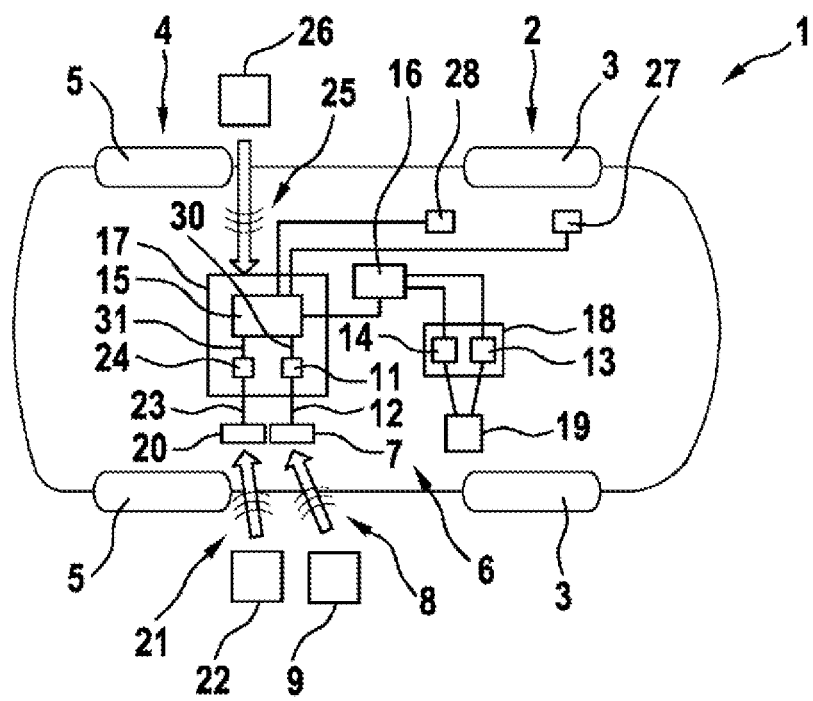
FIG. 1 shows a motor vehicle with a position determining arrangement according to a first exemplary embodiment.

FIG. 1 shows a schematic illustration of a motor vehicle 1. The motor vehicle 1 has a front axle 2 with two steerable front wheels 3 and a rear axle 4 with two rear wheels 5. The motor vehicle device 1 also has a position determining arrangement 6.

The position determining arrangement 6 comprises a receiving device 7 arranged on the motor vehicle 1 and designed to receive navigation satellite signals 8 from navigation satellites, not shown, of a navigation satellite system 9. The receiving device 7 in this case is an antenna arranged on the bodywork of the motor vehicle 1, for example, on an outer side of the bodywork. The position determining arrangement 6 also comprises a processing device 11. The processing device 11 is designed to generate or provide a first signal depending on the navigation satellite signals 8 received by the receiving device 7, said signal describing a navigation satellite signal-based position of the receiving device 7. In this case, the processing device 11 is connected to the receiving device 7 by means of a high-frequency line 12, so that the navigation satellite signals 8 are available to the processing device 11.

In addition, the position determining arrangement 6 comprises at least one inertial sensor. According to the diagram in FIG. 1, two inertial sensors 13 and 14 are present, wherein a first inertial sensor 13 is implemented as an acceleration sensor 13, and a second inertial sensor 14 as a rotation rate sensor 14. The inertial sensors 13 and 14 are mounted at least indirectly on the motor vehicle 1 so that inertial sensors 13 and 14 detect an acceleration or a rotation rate of the motor vehicle 1 in the region of the motor vehicle 1 in which the inertial sensors 13 and 14 are arranged.

The position determining arrangement 6 also comprises a computing unit 15 which is designed to determine an adjusted position of the receiving device 7 depending on the first signal, the detected acceleration, and the detected rotation rate. In particular, the computing unit 15 is designed to determine an adjusted position of another part of the motor vehicle 1 depending on the determined adjusted position of the receiving device 7. This is possible in a straightforward manner due to the known spatial arrangement of the receiving device 7 on the motor vehicle 1. According to the exemplary embodiment shown in FIG. 1, the computing unit 15 is connected to the inertial sensors 13 and 14 by means of a field bus 16. The field bus 16 is implemented as a CAN bus or a FlexRay bus, for example. Alternatively, the computing unit 15 is connected to the inertial sensors 13 and 14 by wired or wireless means, in particular by means of an Ethernet or a radio connection. If the computing unit 15 is connected to the inertial sensors 13 and 14 by means of the radio connection, the computing unit 15 and the inertial sensors 13 and 14 comprise suitable communication devices for contactless transmission of the acceleration or the rotation rate respectively, at least from the inertial sensors 13, 14 to the computing unit 15. The computing unit 15 is connected to the processing unit 11 for communication purposes to transmit the first signal from the processing device 11 to the computing unit 15. According to the illustration of FIG. 1, a line 30 is provided for this purpose. As an alternative to the line 30, means for a contactless transmission of the first signal are present.

The position determining arrangement 6 also comprises a first housing 17. At least the computing unit 15 is arranged in the first housing 17. According to the drawing in FIG. 1, the processing device 11 is also located in the first housing 17. The position determining arrangement 6 also comprises a second housing 18. At least one of the inertial sensors 13 and 14 is arranged in the second housing 18. In this case, both inertial sensors 13 and 14 are located in the second housing 18. The two housings are arranged on the motor vehicle 1. The first housing 17 and the second housing 18 are independent of each other. The two housings 17 and 18 are therefore not directly mechanically fastened to each other. In addition, the housings 17 and 18 are spatially separated from each other. The first housing 17 is therefore arranged outside the second housing 18 and the second housing 18 is outside the first housing 17, as can be seen from FIG. 1. In particular, each of the inertial sensors 13, 14 is assigned a ceramic housing, not shown in FIG. 1, in which the respective inertial sensor 13 or 14 is arranged. The ceramic housings assigned to the inertial sensors 13, 14 are then located inside the second housing 18. Alternatively or in addition, the second housing itself is designed as a ceramic housing. Because the inertial sensors 13, 14 on the one hand and the computing unit 15 on the other are arranged in different housings, the first housing 17 and the second housing 18 have a compact design.

In this case, the second housing 18 is arranged in the region of a transmission tunnel of the motor vehicle 1. This results in a particularly advantageous arrangement of the inertial sensors 13 and 14. Optionally, the position determining arrangement 6 comprises additional inertial sensors that are not shown, arranged on a chassis and/or on the bodywork of the motor vehicle 1 and connected to the computing unit 15 for communication purposes. In this case, the inertial sensors 13 and 14 are connected to a control unit 19. The control unit 19 is implemented as an airbag control unit. The airbag control unit is designed to detect a collision of the motor vehicle 1 depending on the detected acceleration and the detected rotation rate, and to activate the motor vehicle airbags, not shown. As an alternative to an implementation as an airbag control unit, the control unit 19 is implemented as a driving dynamics management control unit. The driving dynamics management control unit is designed to control the driving assistance systems of the motor vehicle 1 depending on the detected acceleration and the detected rotation rate. In particular, the control unit 19 is designed as a combined airbag and driving dynamics control unit. According to the diagram in FIG. 1, the control unit 19 is arranged outside the second housing 18. As an alternative, the control unit 19 is arranged inside the second housing 18. The inertial sensors 13, 14 are then integrated into the control unit 19, for example.

In this case, the position determining arrangement 6 comprises a receiver 20 arranged on the motor vehicle 1 and designed to receive correction satellite service signals 21 from a correction service satellite system 22. The receiver 20 is also an antenna arranged on the bodywork of the vehicle 1. The receiver 20 is connected to an evaluation device 24 by means of a radio-frequency line 23. The evaluation device 24 is designed to generate or provide a second signal depending on the correction service satellite signals 21 received by the receiver 20, said signal describing a correction value or first correction value. The computing unit 15 is designed to take the first correction value or the second signal into account when determining the adjusted position. By taking into account the first correction value, a difference between the determined adjusted position and the actual position of the receiving device 7 can be reduced. The computing unit 15 is connected to the processing unit 24 for communication purposes to transmit the second signal from the evaluation device 24 to the computing unit 15. According to the illustration of FIG. 1, a line 31 is provided for this purpose. As an alternative to the line 31, means for contactless transmission of the second signal are present.

In this case, the computing unit 15 is designed to receive a radio signal 25 that describes a second correction value. The second correction value is also a correction value of a correction service satellite system, in particular the correction service satellite system 22. The radio signal 25 is a radio signal 25 emitted by a communication device 26. The communication device 26 is part of another vehicle or part of infrastructure equipment, such as light-signaling systems, in the environment of the motor vehicle 1. To receive the radio signal 25, the computing unit 15 or the position determining arrangement comprises a suitable communication means, for example a 5G module, a UMTS module or a WLAN module. The computing unit 15 is designed to take the second correction value into account when determining the adjusted position. Taking the second correction value into account also allows a difference between the determined adjusted position and the actual position of the receiving device 7 to be reduced.

In this case, the computing unit 15 is additionally connected to a rotation rate sensor 27. This is assigned to one of the wheels 3 and is designed to detect an angular velocity of this wheel 3. In addition, the computing unit 15 in this case is connected to a steering angle sensor 28. The steering angle sensor 28 is assigned to a steering handle, not shown, and is designed to determine a specified target steering angle as the steering angle. In particular, the computing unit 15 is designed to determine the adjusted position, a speed of the vehicle 1 and a trajectory of the motor vehicle 1 depending on the first signal, the detected acceleration, the detected rotation rate, the second signal, the radio signal 25, the angular velocity and the determined steering angle. In addition, the computing unit 15 is provided with a highly accurate time, such as Universal Time. This is usually contained in the navigation satellite signal 8 and/or in the correction service satellite signal 21.

Figure 2:
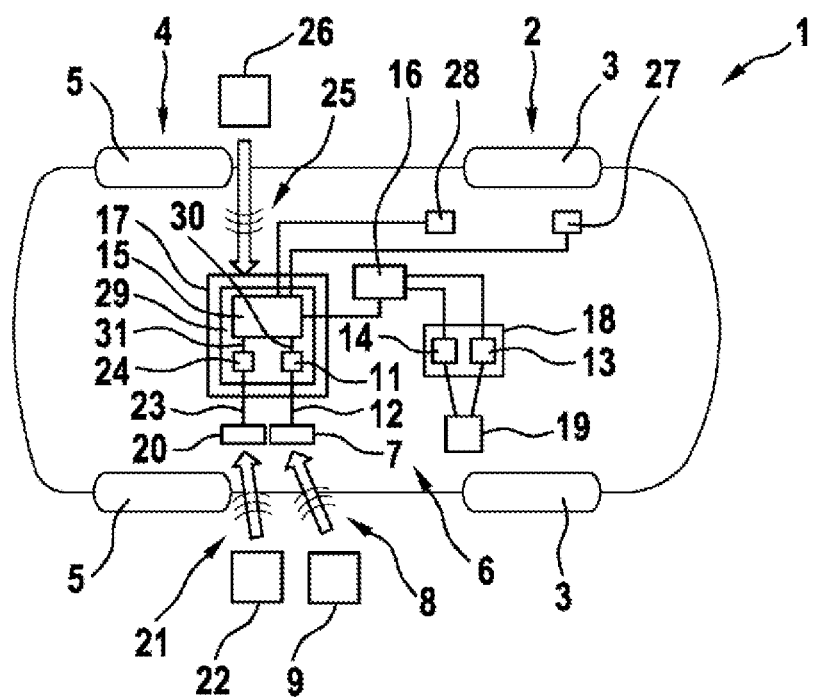
FIG. 2 shows the motor vehicle with a position determining arrangement according to a second exemplary embodiment.

FIG. 2 shows the motor vehicle 1 with the position determining arrangement 6 according to a second exemplary embodiment, wherein the following essentially discusses the differences from the position determining arrangement 6 shown in FIG. 1.

According to the position determining arrangement 6 shown in FIG. 2, the computing unit 15 is integrated into a control unit 29. In the present case, the processing device 11 and the evaluation device 24 are also integrated into the control unit 29. In this case, the first housing 17 is a housing of the control unit 29. The control device 29 in the present case is implemented as a vehicle central control unit. Alternatively or additionally, the control unit 29 is implemented as an airbag control unit or as a vehicle dynamics management control unit. The integration of the computing unit 15 into the control unit 29 further reduces the installation space required for the position determining arrangement 6.

Figure 3:
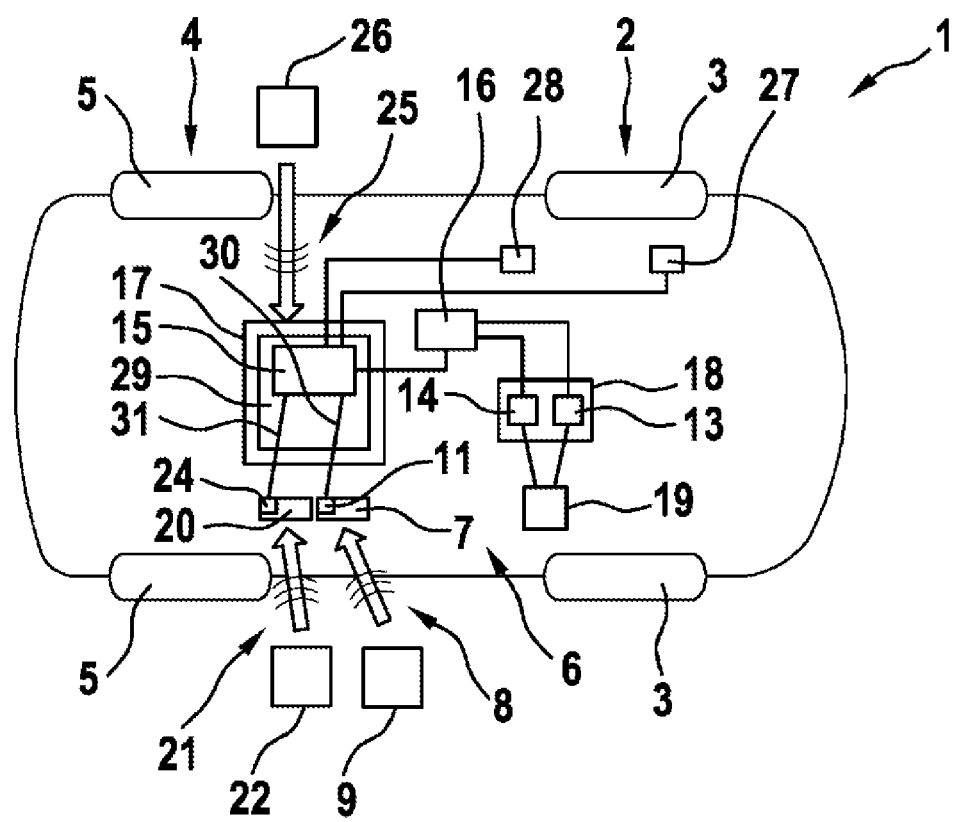
FIG. 3 shows the motor vehicle with a position determining arrangement according to a third exemplary embodiment.

FIG. 3 shows the motor vehicle 1 with the position determining arrangement 6 according to a third exemplary embodiment, wherein the following essentially discusses the differences from the position determining arrangement 6 shown in FIG. 2.

According to the position determining arrangement 6 shown in FIG. 3, the processing device 11 is integrated into the receiving device 7. In this case, the evaluation device 24 is also integrated into the receiver 20. Therefore, the processing device 11 and the evaluation device 24 are arranged outside the first housing 17. Thus, according to the exemplary embodiment shown in FIG. 3, there is only one communication connection between the computing unit 15 and the processing device 11 or the evaluation unit 24. In particular, the processing device 11 according to the exemplary embodiment shown in FIG. 3 is designed to determine itself the navigation satellite signal-based position of the receiving device 7 and to provide the navigation satellite signal-based position as the first signal. In particular, the evaluation device 24 itself is designed to determine the first correction value and to provide the first correction value as the second signal. In this case, for the communication connection of the processing device 11 or the evaluation device 24 to the computing unit 15, the lines 30 and 31 are provided. As an alternative, means are provided for the contactless communication connection of the processing device 11 or the evaluation device 24 to the computing unit 15.

The invention claimed is:

1. A position determining arrangement for a vehicle, comprising:
   a receiving device configured to receive at least one navigation satellite signal from at least one navigation satellite;
   a processing device configured to provide a first signal depending on the received navigation satellite signal, said first signal describing a navigation satellite signal-based position of the receiving device in a coordinate system;
   at least one inertial sensor configured to detect at least one of an acceleration and a rotation rate;
   a computing unit configured to determine an adjusted position of the receiving device in the coordinate system depending on the first signal and the at least one of the acceleration and the rotation rate;
   a first housing in which at least the computing unit is arranged; and
   a second housing independent of and spatially separated from the first housing,
   wherein the inertial sensor is arranged in the second housing.

2. The position determining arrangement as claimed in claim 1, wherein:
   the position determining arrangement is part of a vehicle, and
   the first housing and the second housing are arranged in the vehicle so as to be spatially separated from each other.

3. The position determining arrangement as claimed in claim 2, wherein the vehicle is a motor vehicle.

4. The position determining arrangement as claimed in claim 1, wherein the inertial sensor is arranged in a ceramic housing.

5. The position determining arrangement as claimed in claim 4, wherein the ceramic housing is arranged in the second housing or formed by the second housing.

6. The position determining arrangement as claimed in claim 1, further comprising:
an evaluation device configured to provide a second signal representing a correction value that is based on at least one correction service satellite signal received from at least one correction service satellite via the receiving device or a receiver of the position determining arrangement that is configured to receive the correction service satellite signal.

7. The position determining arrangement as claimed in claim 6, wherein the processing device and/or the evaluation device are arranged in the first housing.

8. The position determining arrangement as claimed in claim 6, wherein the processing device and/or the evaluation device are arranged outside the first housing.

9. The position determining arrangement as claimed in claim 6, wherein the processing device is integrated into the receiving device and/or the evaluation device is integrated into the receiver.

10. The position determining arrangement as claimed in claim 1, wherein the computing unit is connected to the inertial sensor for communication purposes via a field bus, an Ethernet connection, and/or a radio connection.

11. The position determining arrangement as claimed in claim 10, wherein the computing unit is connected to the inertial sensor via a CAN bus or FlexRay bus.

12. The position determining arrangement as claimed in claim 1, wherein the inertial sensor is connected to a control unit.

13. The position determining arrangement as claimed in claim 12, wherein the control unit is an airbag control unit and/or a vehicle dynamics management control unit.

14. The position determining arrangement as claimed in claim 1, wherein the computing unit is integrated into a control unit.

15. The position determining arrangement as claimed in claim 14, wherein the control unit is an airbag control unit, a vehicle dynamics management control unit, and/or a vehicle central control unit.

16. The position determining arrangement as claimed in claim 1, further comprising at least one additional inertial sensor.

17. The position determining arrangement as claimed in claim 1, wherein one or more sensors of the at least one inertial sensor is arranged in a region of a transmission tunnel of the vehicle.

18. The position determining arrangement as claimed in claim 1, wherein one or more sensors of the at least one inertial sensor is arranged on a chassis or bodywork of the vehicle.

19. The position determining arrangement as claimed in claim 1, wherein the receiving device is an antenna.

20. A motor vehicle comprising:
a position determining arrangement comprising:
a receiving device configured to receive at least one navigation satellite signal from at least one navigation satellite;
a processing device configured to provide a first signal depending on the received navigation satellite signal, said first signal describing a navigation satellite signal-based position of the receiving device in a coordinate system;
at least one inertial sensor configured to detect at least one of an acceleration and a rotation rate;
a computing unit configured to determine an adjusted position of the receiving device in the coordinate system depending on the first signal and the at least one of the acceleration and the rotation rate;
a first housing in which at least the computing unit is arranged; and
a second housing independent of and spatially separated from the first housing, wherein the inertial sensor is arranged in the second housing.

* * * * *